United States Patent [19]

Rutschmann

[11] Patent Number: 4,510,896

[45] Date of Patent: Apr. 16, 1985

[54] MULTI-CYLINDER COMBUSTION ENGINE INTAKE MANIFOLD

[75] Inventor: Erwin Rutschmann, Bad Hezzenalb, Fed. Rep. of Germany

[73] Assignee: Dr. Ing. h.c.f. Porsche Aktiengesellschaft, Stuttgart, Fed. Rep. of Germany

[21] Appl. No.: 548,832

[22] Filed: Nov. 4, 1983

[30] Foreign Application Priority Data

Mar. 16, 1983 [DE] Fed. Rep. of Germany ....... 3309373

[51] Int. Cl.³ .............................................. F02B 27/00
[52] U.S. Cl. .......................... 123/52 MB; 123/52 MV
[58] Field of Search ......... 123/52 M, 52 MB, 52 MV, 123/59 R

[56] References Cited

U.S. PATENT DOCUMENTS

| | | | |
|---|---|---|---|
| 1,912,047 | 5/1933 | Suczek | 123/52 M |
| 2,012,902 | 8/1935 | Barkeij | 123/52 MV |
| 3,796,048 | 3/1974 | Annus et al. | 123/52 M |
| 4,300,488 | 11/1981 | Cser | 123/52 M |

FOREIGN PATENT DOCUMENTS 278967 10/1930 Italy ................................ 123/52 M Primary Examiner—Craig R. Feinberg
Attorney, Agent, or Firm—Barnes & Thornburg

[57] ABSTRACT

An air intake manifold arrangement is provided for an internal combustion engine of boxer or V-type having two similar groups of cylinders. The manifold I formed as an I-shaped distribution piece with a straight connecting pipe connecting two resonance chambers. A suction connection fitting is perpendicular to and opens into the connecting pipe with a single opening. Individual suction pipes extend parallel to the connecting pipe and outwardly of the respective resonance chambers to respective ones of the cylinders.

13 Claims, 1 Drawing Figure

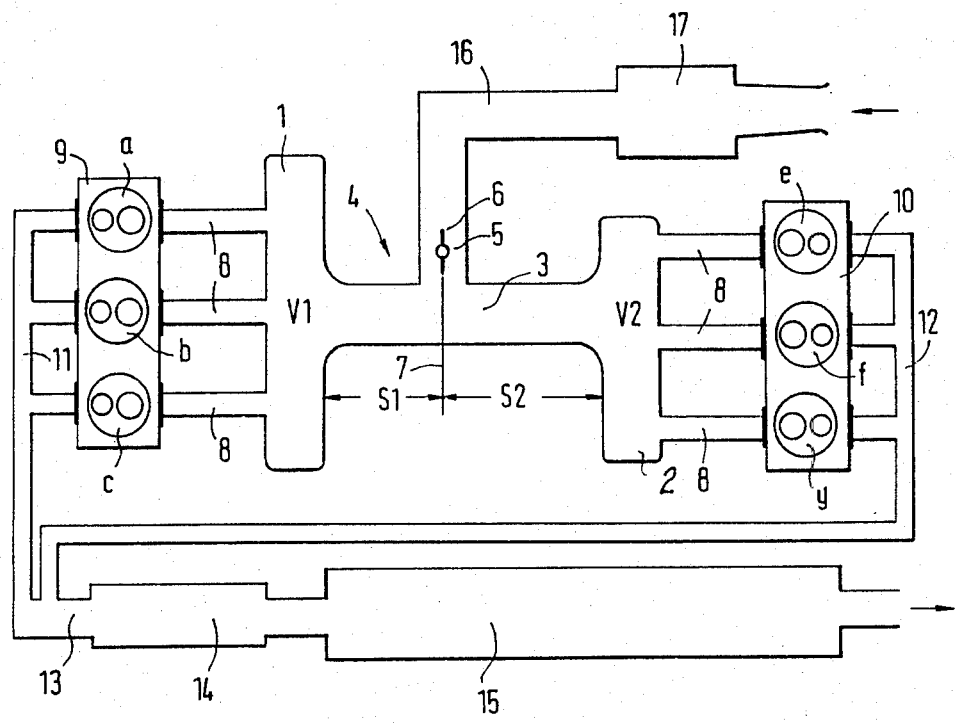

ial loading.
MULTI-CYLINDER COMBUSTION ENGINE INTAKE MANIFOLD

BACKGROUND AND SUMMARY OF THE INVENTION

The invention relates to an air charging manifold arrangement for a multi-cylinder combustion engine which has its cylinders arranged in a boxer or V-configuration with two similar cylinder groups disposed oppositely of one another.

According to a known combustion engine (DE-OS No. 1,939,049), the intake manifold is so formed for the oscillating charging air that a standing half wave is formed. The nodes of this half wave are disposed at the connecting point of a perpendicular extending suction connection piece, while the maximal half wave is contiguous to the suction pipes of the cylinders, for example, at the inlet valves. In an especially space-saving emboidment, the bent or folded single suction pipes are connected outwardly in respectively two groups at two pipes, centrally of which a common connection pipe protrudes inwardly and contains the suction pipe connection. This arrangement is disadvantageous because of the high loss of stream flow resulting from the double turning around of the suction air and because of a poor filling rate of the cylinder which leads to a significant load decrease of the combustion engine. Furthermore, the flow path to the individual cylinders is differentially long so that there is a resultant corresponding differential loading.

A problem contemplated by the invention is the development of an air intake manifold arrangement with the smallest feasible throttling losses and which facilitates a correspondingly similar filling or charging of all of the connected cylinders.

A solution of this problem is advantageously obtained according to the invention by providing that the air suction manifold is formed as an "I" shaped distribution piece with two resonance chambers connected by a straight connecting pipe, with straight parallel pipes leading from the respective resonance chambers to cylinders of associated cylinder groups, and with a suction connection fitting extending perpendicularly to and connected with a single opening to the connecting pipe.

In especially preferred embodiments at the oppositely disposed walls of the resonance chambers the straight single suctin pipes for each cylinder group are so connected that they are symmetrical and parallel at the connecting pipe. By means of a predetermined relationship between the volume and distance from the centerline of the suction connection fitting, a half wave is formed in the distributing piece, which halfwave has a pressure maximum at the connection position of the single suction pipes at the adjacent resonant chambers. The incoming air through the suction connection fitting in the distributing piece can flow through in straight paths without noticeable travelling losses to the inlet valves of the cylinders. Through the symmetrical arrangement of the individual suction pipes the stream path for all cylinders is similarly long so that there results also similar filling or charging rates and similar loading for all cylinders.

Because the perpendicular connection of the suction connection fitting at the connecting pipe forms an effective neutralization of the oscillations formed in the distributing piece from the oscillations in the inlet part from the air filter to the suction connecting filling, the volume and the length of the distribution piece can optimally be arranged with respect to the cylinders so that adjustment of charging defects over a large rotational regime of the combustion machine is obtained. The optimum results are obtained when the total volume of the resonance chambers is slightly smaller than the entire working volume of the cylinders. When the distance between one resonance chamber to the middle of the suction connection fitting is smaller than the distance to the other resonance chamber, according to the invention its volume is correspondingly increased so that the product of the volume and the distance remains respectively constant. The illustrated preferred embodiment of the invention involves a six-cylinder boxermotor.

Further objects, features, and advantages of the present invention will become more apparent from the following description when taken in connection with the accompanying drawing which shows, for purposes of illustration only, a single embodiment in accordance with the present invention.

BRIEF DESCRIPTION OF THE DRAWING

The single drawing FIGURE schematically illustrates a six-cylinder boxermotor with an air intake manifold arrangement made in accordance with a preferred embodiment of the invention.

DETAILED DESCRIPTION OF THE INVENTION

Referring to the single drawing FIGURE, a six-cylinder internal combustion engine is schematically shown, with its cylinders a, b, c, d, e, and f.

An I-shaped distribution piece 4 is formed from a resonance chamber 1 having a volume V1, a resonance chamber 2 having a volume V2 and a connection pipe 3. Perpendicularly to the connection pipe 3, a suction connection fitting 5 is connected. An adjustable throttle flap 6 is disposed in fitting 5. The middle of the suction connection fitting 5, depicted by line 7, is a distance $S1=0.105$ m from the resonance chamber 1 and a distance $S2=0.125$ m from the resonance chamber 2. The volumes V1, V2 and distances S1, S2 are selected to provide a relationship:

$$(V1/V2)=(S2/S1),$$

so that with the above indicated distances S1 and S2, $$V1=1.8\times10^{-3} \text{ m}^3$$

$$V2=1.5\times10^{-3} \text{ m}^3$$

Three straight individual suction pipes 8 with a length $L=0.215$ m extend parallel to the connection pipe 3 and respectively from the resonance chamber to the inlet valves of the cylinders a, b, c, of cylinder group 9. In a corresponding manner, three similar straight individual suction pipes 8 with the same length $L=0.215$ m extend parallel to the connection pipe 3 from resonance chamber 2 to the inlet valves of the cylinders d, e, f of cylinder group 10. The pipes 8 are tapered and narrowed in the outflow direction from a diameter of 0.044 to 0.040 m.

The exhaust of the two cylinder groups 9 and 10 is guided over exhaust manifolds 11 and 12 to exhaust line 13 and reaches the atmosphere after going through a premuffler 14 and a main muffler 15. The suction connection 5 is connected via suction line 16 with an air filter, which suction line sucks the air out of the atmosphere.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An air intake manifold arrangement for an internal combustion engine of the type having two similar groups of cylinders arranged spaced from one another in V-shaped relation, said manifold arrangement comprising:

first and second resonance chambers connected to one another by a straight connecting pipe at opposite ends of the straight connecting pipe, the first and second resonance chambers and the straight connecting pipe cooperating to form a H-shaped air intake manifold, a suction connection fitting extending perpendicularly to the connecting pipe and including a single air jupply opening into the connecting pipe, respective individual first suction pipes leading from the first resonance chamber to respective cylinders of a first group, and respective individual second suction pipes leading from the second chamber to respective cylinders of a second group, said first and second suction pipes extending parallel to the connecting pipe and outwardly of the respective resonance chambers at their sides opposite the connecting pipe.

2. An arrangement according to claim 1, wherein said first resonance chamber exhibits a smaller distance S1 to the middle of the suction connection fitting and has a larger volume V1 than does the second resonance chamber.

3. An arrangement according to claim 2, wherein the volumes V1 and V2 and the distance S1 and S2 from the middle of the suction connection fitting of the first and second resonance chambers exhibit the following relationship:

$$(V1/V2) = (S2/S1).$$

4. An arrangement according to claim 2, wherein the total volume V1 and V2 of the first and second resonance chamber is approximately equal to the entire volume of all the cylinder working chambers.

5. A multi-cylinder V-shaped combustion engine comprising:

a first group of cylinders on one V-bank having respective first air inlet means, a second group of cylinders on an opposite V-bank having respective second air inlet means, first and second resonance chambers connected to one another by a straight connecting pipe at opposite ends of the straight connecting pipe, the first and second resonance chambers and the straight connecting pipe cooperating to form an H-shaped air intake manifold, a suction connection fitting extending perpendicularly to the straight connecting pipe and including a single air supply opening into the connecting pipe, respective individual first suction pipes leading from the first resonance chamber to respective ones of said second air inlet means, and respective individual second suction pipes leading from the second resonance chamber to respective ones of said second air inlet means, said first and second suction pipes extending parallel to the connecting pipe and outwardly of the respective resonance chambers at their sides opposite the connecting pipe.

6. An engine according to claim 1, wherein the single suction pipes leading from the resonance chambers to the cylinder air inlet means are slightly conically narrowed in the direction toward the air inlet means.

7. An engine according to claim 1, wherein said cylinders are arranged in one of a boxer or V-construction into two similar groups.

8. An engine according to claim 1, wherein said first resonance chamber exhibits a smaller distance S1 to the middle of the suction connection fitting and has a larger volume V1 than does the second resonance chamber.

9. An engine according to claim 8, wherein the total volume V1 and V2 of the first and second resonance chamber is approximately equal to the entire volume of all the cylinder working chambers.

10. An engine according to claim 8, wherein the volumes V1 and V2 and the distance S1 and S2 from the middle of the suction connection fitting of the first and second resonance chambers exhibit the following relationship:

$$(V1/V2) = (S2/S1).$$

11. An engine according to claim 10, wherein the total volume V1 and V2 of the first and second resonance chamber is approximately equal to the entire volume of all the cylinder working chambers.

12. An engine according to claim 10, wherein the single suction pipes leading from the resonance chambers to the cylinder air inlet means are slightly conically narrowed in the direction toward the air inlet means.

13. An engine according to claim 10 wherein, said cylinders are arranged in one of a boxer or V-construction into two similar groups.

* * * * *

UNITED STATES PATENT AND TRADEMARK OFFICE
CERTIFICATE OF CORRECTION

PATENT NO. : 4,510,896
DATED : April 16, 1985
INVENTOR(S) : Erwin Rutschmann

It is certified that error appears in the above-identified patent and that said Letters Patent is hereby corrected as shown below:

Column 1, line 20, change "emboidment" to --embodiment--.

line 48, change "suctin" to --suction--.

Column 3, line 25, change "jupply" to --supply--.

Signed and Sealed this

Third Day of September 1985

[SEAL]

Attest:

DONALD J. QUIGG

Attesting Officer  Acting Commissioner of Patents and Trademarks - Designate